United States Patent
Demitroff et al.

(10) Patent No.: US 9,683,649 B2
(45) Date of Patent: Jun. 20, 2017

(54) VEHICLE AND INSULATING DEVICE FOR GEARBOX

(71) Applicant: FORD GLOBAL TECHNOLOGIES, LLC, Dearborn, MI (US)

(72) Inventors: Danrich Henry Demitroff, Okemos, MI (US); Mathew John Fast, Dearborn Heights, MI (US); Michael Levin, Ann Arbor, MI (US); Sunil Katragadda, Canton, MI (US); Furqan Zafar Shaikh, Troy, MI (US); W. Cary Cole, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/009,331

(22) Filed: Jan. 28, 2016

(65) Prior Publication Data
US 2016/0312876 A1  Oct. 27, 2016

Related U.S. Application Data

(60) Provisional application No. 62/151,208, filed on Apr. 22, 2015.

(51) Int. Cl.
| | |
|---|---|
| *F16H 57/02* | (2012.01) |
| *F16H 57/031* | (2012.01) |
| *F16H 57/04* | (2010.01) |
| *F01L 5/00* | (2006.01) |
| *F16H 57/037* | (2012.01) |
| *F01M 5/00* | (2006.01) |

(52) U.S. Cl.
CPC .......... *F16H 57/037* (2013.01); *F01M 5/005* (2013.01); *F16H 57/02* (2013.01); *F16H 57/0419* (2013.01); *F16H 57/0483* (2013.01)

(58) Field of Classification Search
CPC .......... F01M 5/00; F01M 5/005; F01M 5/007; F16N 2210/12; F16H 48/08; F16H 57/02; F16H 57/037; F16H 57/0412; F16H 57/0413; F16H 57/0415; F16H 57/0417; F16H 57/0483; F16H 57/0419
See application file for complete search history.

(56) References Cited

U.S. PATENT DOCUMENTS

| | | | | | |
|---|---|---|---|---|---|
| 4,031,780 | A | * | 6/1977 | Dolan | B60K 17/3465 180/248 |
| 4,420,990 | A | * | 12/1983 | Hauser | F16H 57/038 184/6.12 |

(Continued)

FOREIGN PATENT DOCUMENTS

| | | | | |
|---|---|---|---|---|
| DE | 3436728 A1 | | 4/1985 | |
| DE | 102009005896 A1 | * | 7/2010 | ......... F16H 57/0413 |

(Continued)

*Primary Examiner* — Adam D Rogers
(74) *Attorney, Agent, or Firm* — James Dottavio; Brooks Kushman P.C.

(57) ABSTRACT

A vehicle is provided. The vehicle includes a power source, at least one wheel, a gearbox. The gearbox includes a housing, gearing disposed in the housing, and an insulator disposed between the gearing and the housing. The gearing is configured to couple the power source to the at least one wheel. The insulator is configured to reduce thermal energy losses of a fluid that lubricates the gearing.

14 Claims, 3 Drawing Sheets

(56) References Cited

U.S. PATENT DOCUMENTS

| | | | | |
|---|---|---|---|---|
| 5,505,112 | A * | 4/1996 | Gee | F16H 57/0447 180/339 |
| 5,540,300 | A * | 7/1996 | Downs | F16H 57/0412 184/104.1 |
| 5,709,135 | A * | 1/1998 | Baxter | B60K 17/20 475/160 |
| 5,768,954 | A * | 6/1998 | Grabherr | F16H 57/0447 184/11.1 |
| 6,345,712 | B1 * | 2/2002 | Dewald | F16D 55/40 188/264 E |
| 6,413,183 | B1 * | 7/2002 | Ishikawa | F16H 48/08 475/160 |
| 6,830,096 | B1 * | 12/2004 | Fett | F16H 57/0412 165/104.21 |
| 8,036,863 | B2 * | 10/2011 | Schankin | F16C 35/067 345/418 |
| 8,409,044 | B2 * | 4/2013 | Hilker | F16H 57/0483 475/160 |
| 8,523,733 | B1 | 9/2013 | Lippert | |
| 8,528,697 | B2 | 9/2013 | Mordukhovich et al. | |
| 8,858,381 | B2 * | 10/2014 | Trost | B60B 35/16 475/160 |
| 8,974,342 | B2 * | 3/2015 | Kwasniewski | F16H 57/0409 475/160 |
| 2003/0188932 | A1 | 10/2003 | Schneider et al. | |
| 2014/0260790 | A1 * | 9/2014 | Passino | F16H 57/0409 74/606 R |
| 2014/0290922 | A1 | 10/2014 | Palanchon | |
| 2016/0003098 | A1 * | 1/2016 | Schwarz | F02C 7/24 415/122.1 |
| 2016/0377164 | A1 * | 12/2016 | Fast | F16H 57/0423 475/160 |

FOREIGN PATENT DOCUMENTS

| | | | | |
|---|---|---|---|---|
| DE | 102011089189 A1 * | 6/2013 | | F16P 1/02 |
| DE | 102011120748 A1 * | 6/2013 | | F16H 57/0412 |
| EP | 1918613 B1 | 1/2010 | | |
| SE | WO 2015092471 A1 * | 6/2015 | | F16H 57/0409 |

* cited by examiner

VEHICLE AND INSULATING DEVICE FOR GEARBOX

CROSS-REFERENCE TO RELATED APPLICATIONS

This application claims the benefit of U.S. provisional application No. 62/151,208 filed on Apr. 22, 2015, the disclosure of which is hereby incorporated in its entirety by reference herein.

TECHNICAL FIELD

The present disclosure relates to vehicles and various gearboxes included in the powertrain of a vehicle.

BACKGROUND

Lubrication fluid in a vehicle gearbox may take a long time to warm up during a warm up phase and/or under cold ambient conditions. Heat may be generated through torque losses in the moving parts of the gearbox and friction (churning) losses in the lubrication fluid. This heat, however, tends to dissipate when the lubrication fluid contacts the housing of the gearbox. When the lubrication fluid is heated, a resulting reduction in viscosity may reduce the increased torque losses and friction losses that occur under cold ambient conditions. By lowering the torque and friction losses an improvement in fuel economy may be obtained.

Torque losses in a gearbox are load-dependent losses that occur when a load is transferred through the gears, shafts, bearings, or other moving parts. Friction losses in a gearbox are no-load losses that may occur without any load being transferred. The friction losses are due to the rotation of the gears, shafts, bearings, or other moving parts in the lubrication fluid. Friction losses are affected by lubrication fluid level, viscosity of the lubrication fluid, and rotational speed of the moving parts in the gearbox. Under cold conditions the thermal mass of the gearbox housing may be much larger than the thermal mass of the lubrication fluid resulting in increased periods of time to heat the lubrication fluid to a desired temperature.

SUMMARY

A gearbox for a vehicle is provided. The gearbox includes a housing and gearing disposed in the housing. The gearing is configured to transfer power from a power source to at least one wheel. An insulator is disposed between the gearing and the housing. The insulator is configured to reduce the thermal energy losses of a fluid that lubricates the gearing.

An axle for a vehicle is provided. The axle includes a housing and differential gearing disposed in the housing. The differential gearing is connected to an input shaft, a first output shaft, and a second output shaft. An insulator is disposed between the differential gearing and the housing. The insulator is configured to reduce the thermal energy losses of a fluid that lubricates the differential gearing.

A vehicle is provided. The vehicle includes a power source, at least one wheel, and a gearbox. The gearbox includes a housing, gearing disposed in the housing, and an insulator disposed between the gearing and the housing. The gearing is configured to couple the power source to the at least one wheel. The insulator is configured to reduce the thermal energy losses of a fluid that lubricates the gearing.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
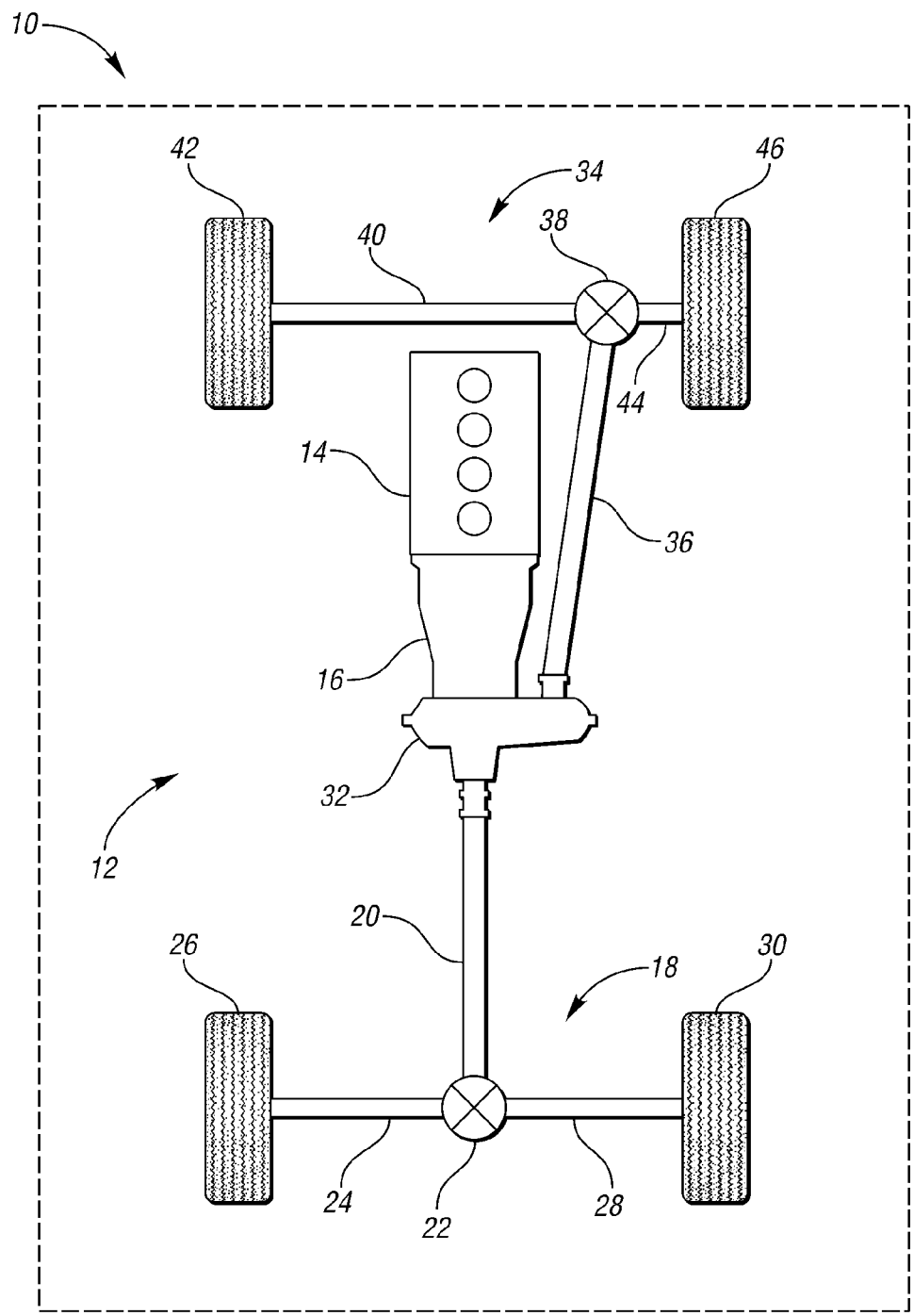
FIG. 1 is a schematic diagram illustrating a vehicle and a vehicle powertrain.

Referring to FIG. 1, a vehicle 10 and a powertrain 12 of the vehicle 10 are illustrated. The powertrain 12 may include a power source (power generating device) 14. The power source 14 may be an internal combustion engine, electric machine (electric motor), or any other device capable of generating motive power in the powertrain 12. The power source 14 may be connected to an input of a transmission 16. The transmission 16 may be a manual transmission, a multiple step-ratio automatic transmission, a continuously variable transmission (CVT), or any other device capable of adjusting the gear ratio between the input and an output of the transmission 16. The vehicle 10 may include a first axle 18. The first axle 18 may be connected to the output of the transmission 16 via a first driveshaft 20.

The first driveshaft 20 may be connected to a first differential 22 located on the first axle 18. The first driveshaft 20 may also be referred to as an input to the first differential 22. A first half shaft 24 of the first axle 18 may connect the first differential 22 to a first wheel 26 of the first axle 18. A second half shaft 28 of the first axle 18 may connect the first differential 22 to a second wheel 30 of the first axle 18. The first half shaft 24 and the second half shaft 28 of the first axle 18 may also be referred to as outputs of the first differential 22. The first differential 22 is configured to allow the first half shaft 24 and second half shaft 28 to rotate at different speeds, thereby allowing the first wheel 26 and second wheel 30 rotate at different speeds. In this configuration, power generated by the power source 14 may be transferred to the first wheel 26 and second wheel 30 of the first axle 18 via the transmission 16, first driveshaft 20, first differential 22, first half shaft 24 and second half shaft 28.

The powertrain 12 may also include a transfer case 32 connected to the output of the transmission 16. The transfer case 32 may be configured to selectively transfer power between the first axle 18 and a second axle 34. The transfer case 32 may include several selectable power transferring modes. The power transferring modes may include transferring power to only one of the first axle 18 or second axle 34, simultaneously transferring power to the first axle 18 and second axle 34, or a neutral mode where no power is transferred to either the first axle 18 or second axle 34.

If the powertrain 12 includes a transfer case 32, the transfer case 32 may be disposed between the transmission 16 and the first driveshaft 20. A second driveshaft 36 may connect the second axle 34 to the transfer case 32. The transmission 16 may be referred to as the input to the transfer case 32 while the first driveshaft 20 and second driveshaft 36 may be referred to as outputs of the transfer case 32.

The second driveshaft 36 may be connected to a second differential 38 located on the second axle 34. The second driveshaft 36 may also be referred to as an input to the second differential 38. A first half shaft 40 of the second axle 34 may connect the second differential 38 to a first wheel 42 of the second axle 34. A second half shaft 44 of the second axle 34 may connect the second differential 38 to a second wheel 46 of the second axle 34. The first half shaft 40 and second half shaft 44 of the second axle 34 may also be referred to as outputs of the second differential 38. The second differential 38 is configured to allow the first half shaft 40 and second half shaft 44 to rotate at different speeds, thereby allowing the first wheel 42 and second wheel 46 two rotate at different speeds. In this configuration, power generated by the power source 14 may be transferred to the first wheel 26 and second wheel 30 of the first axle 18 via the transmission 16, transfer case 32, first driveshaft 20, first differential 22, first half shaft 24 and second half shaft 28. Power generated by the power source 14 may also be transferred to the first wheel 42 and second wheel 46 of the second axle 34 via the transmission 16, transfer case 32, second driveshaft 36, second differential 38, first half shaft 40, and second half shaft 44.

The powertrain 12 illustrated in FIG. 1 is meant for illustrative purposes only. Therefore, the disclosure should not be construed as limited to the powertrain 12 illustrated in FIG. 1. For example, the powertrain 12 may be a front wheel drive only, rear wheel drive only, the transmission 16 may incorporate the transfer case 32, the transmission 16 may incorporate one of the differentials 22, 38, the transmission 16 may incorporate the transfer case 32 and one of the differentials 22, 38, the powertrain 12 may not include the transfer case 32, etc. Additionally, the powertrain 12 may include only one power source 14 or the powertrain 12 may include multiple power sources, such as the powertrain of a hybrid vehicle. If the powertrain is a hybrid powertrain of a hybrid vehicle, it may include both an internal combustion engine and one or more electric machines as power sources. An electrical machine may be configured to act as both a motor to provide power to move the vehicle and a as generator to recharge a traction battery of the vehicle. The electric machine of a hybrid vehicle may receive energy from the internal combustion engine to recharge the battery, or the electrical machine may recuperate moving energy of the vehicle through methods such as regenerative braking. The disclosure should be construed to include any type of hybrid vehicle, including but not limited to, series hybrid vehicles, parallel hybrid vehicles, series-parallel hybrid vehicles, power-split hybrid vehicles, modular hybrid vehicles, plug-in hybrid electric vehicles (PHEV), and electric-fuel-cell hybrid vehicles.

The first differential 22, second differential 38, transmission 16, and transfer case 32 may be generically referred to as gearboxes. The gearboxes may include a housing that houses and supports shafts, gears, brakes, clutches, bearings, fluid paths, etc. The transmission 16 may include a torque converter and a hydraulic/control system that automatically shifts the gears in the transmission. The transfer case 32 may be a gear driven type or chain driven type transfer case. The transfer case 32 may also be a married type transfer case that shares a housing with the transmission 16 or a divorced/independent type transfer case that includes its own housing that is not shared with the transmission 16. Additionally, the transfer case 32 may be a manual shift on-the-fly (MSOF) or an electronic shift on-the-fly (ESOF) type transfer case or may be shiftable only when the vehicle is stopped. The first differential 22 and second differential 38 may be open, limited slip, or locking type differentials. Additionally, if the first differential 22 and second differential 38 are limited slip type differentials, they may be clutch pack, Cone, hydraulic locking, or Torsen® type limited slip differentials.

Figure 2:
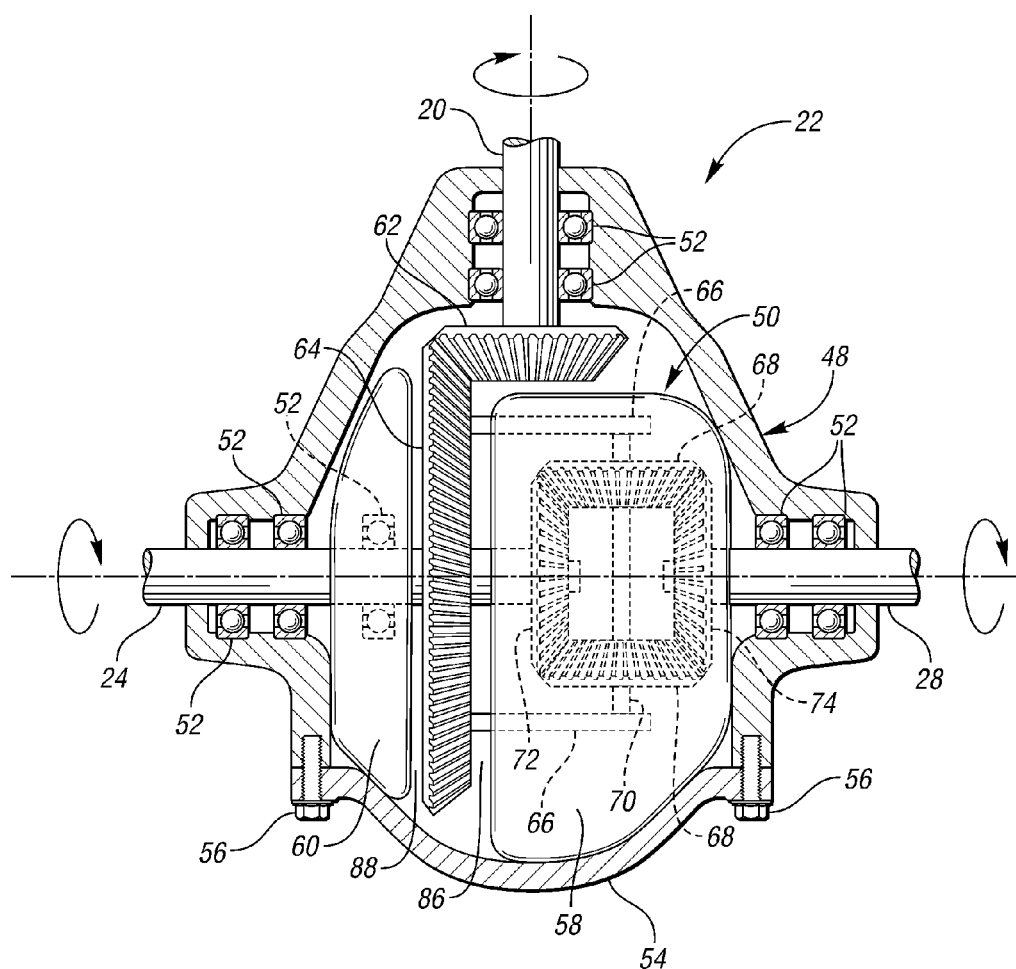
FIG. 2 is a cut away top view of a differential.
Figure 3:
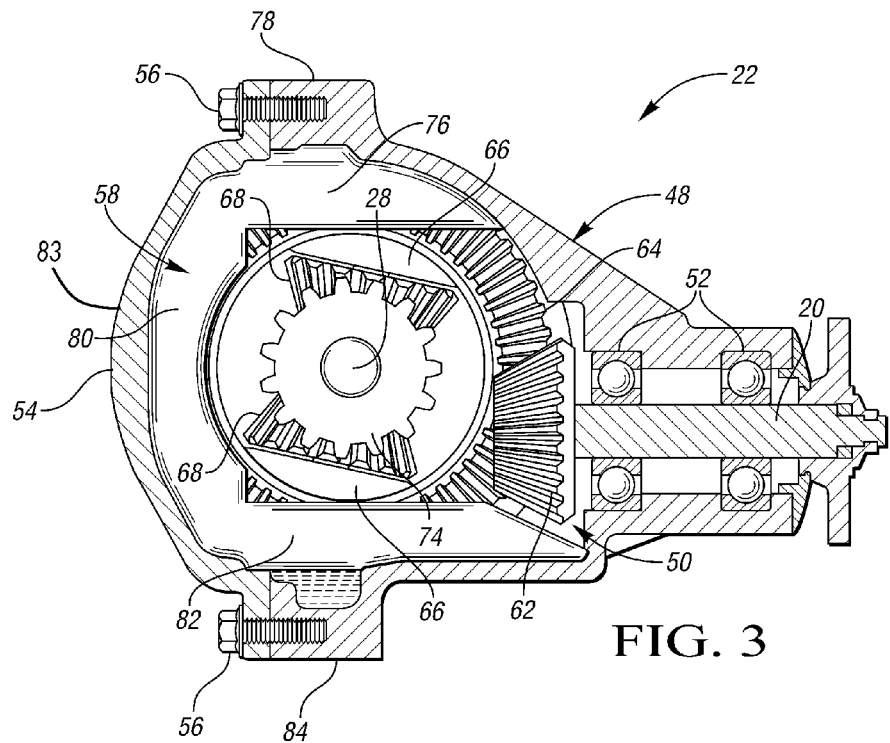
FIG. 3 is a cut away side view of the differential.

Referring to FIGS. 2 and 3, the first differential 22 is illustrated. It should be noted, however, that the description of the first differential 22 in FIGS. 2 and 3 may also be applicable to the second differential 38. The first differential 22 includes a housing 48 and gearing 50 disposed inside the housing 48. The gearing 50 is configured to couple the power source 14 to at least one wheel of the vehicle 10. As described above, power flows from the power source 14 through various components of the powertrain 12 and into the first differential 22 via the first driveshaft 20. The power entering the first differential 22 is transferred from the first driveshaft 20 to the first half shaft 24 and second half shaft 28 via the gearing 50, and then from the first half shaft 24 and second half shaft 28 to the first wheel 26 and second wheel 30 of the first axle 18. A series of bearings 52 may be used to support the first driveshaft 20, first half shaft 24, and second half shaft 28.

The housing 48 may also include a detachable cover 54. The detachable cover 54 may include a series of fasteners 56 that are utilized to secure the detachable cover 54 to the housing 48. A gasket may be provided between the detachable cover 54 and housing 48 to prevent a fluid that is used to lubricate the gearing from leaking out of the first differential 22.

At least one insulator may be disposed between the gearing 50 and the housing 48. The at least one insulator may be configured to reduce the thermal energy losses of the fluid that is used to lubricate the gearing. The thermal energy losses of the fluid that is used to lubricate the gearing 50 may occur when heat is transferred from the fluid to the housing 48, detachable cover 54, or to the external environment through the housing 48 or detachable cover 54. A first insulator 58 and a second insulator 60 are depicted in the embodiment in FIGS. 2 and 3.

The gearing 50 may include the first driveshaft 20, the first half shaft 24, the second half shaft 28, and a series of gears that are used to connect the first driveshaft 20 to the first half shaft 24 and second half shaft 28. A first bevel gear 62 that may be affixed to the first driveshaft 20 may mesh with a bevel ring gear 64. The bevel ring gear 64 may be attached to a carrier 66 that includes at least one bevel planet gear 68. The bevel planet gears 68 may be rotatably affixed to the carrier by at least one pin 70. The bevel planet gears 68 may mesh with a second bevel gear 72 that is affixed to the first half shaft 24. The bevel planet gears 68 may also mesh with a third bevel gear 74 that is affixed to the second half shaft 28.

Referring to FIG. 3, the first insulator 58 may include a first portion 76 disposed between the gearing 50 and a top side of the housing 78, a second portion 80 disposed between the gearing 50 and the detachable cover 54, and a third portion 82 disposed between the gearing 50 and a bottom side of the housing 84. The detachable cover 54 forms a back side of the housing 83. It should be noted that the second insulator 60 may also include a first portion, second portion and third portion that are disposed between the top side of the housing 78, detachable cover 54, and bottom side of the housing 84, respectively. As shown in FIG. 2, the first insulator 58 may be disposed on a first side 86 of the bevel ring gear 64 and the second insulator 60 may be disposed on a second side 88 of the bevel ring gear 64.

Figure 4:
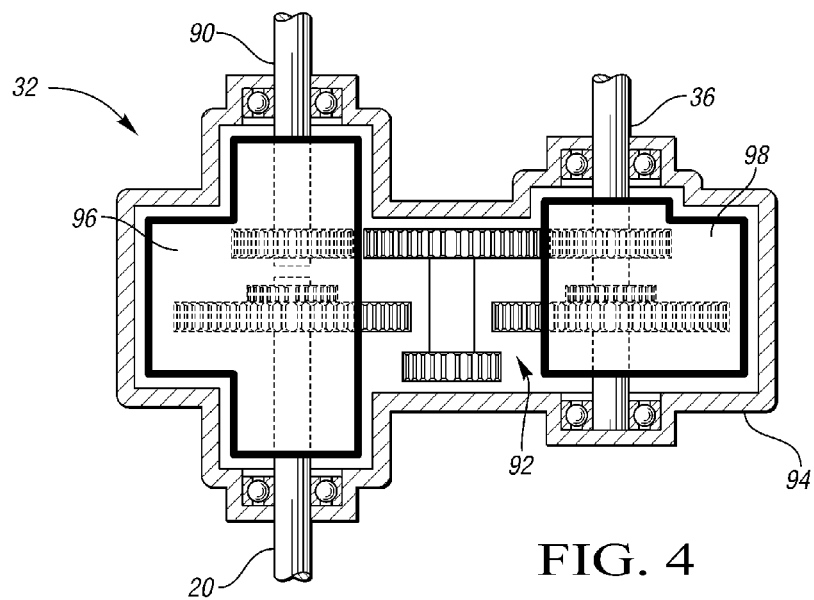
FIG. 4 is a cut away top view of a transfer case.

Referring to FIG. 4, the transfer case 32 is illustrated. The transfer case 32 may be connected to and receive power from an output 90 of the transmission 16. The transfer case 32 may include gearing 92 that is configured to transfer power to the first driveshaft 20 and eventually to the first axle 18. The gearing 92 of the transfer case 32 may also be configured to transfer power to the second driveshaft 36 and eventually to the second axle 34. The gearing 92 may include selectable gears that are configured to engage and disengage the power flow path between the output 90 of the transmission 16 and the first driveshaft 20. The gearing 92 may also include selectable gears that are configured to engage and disengage the power flow path between the output 90 of the transmission 16 and the second driveshaft 36.

At least one insulator may be disposed between the gearing 92 and a housing 94 of the transfer case 32. The at least one insulator may be configured to reduce the thermal energy losses of the fluid that is used to lubricate the gearing. The thermal energy losses of the fluid that is used to lubricate the gearing 50 may occur when heat is transferred from the fluid to the housing 94 or to the external environment through the housing 94. A first insulator 96 and a second insulator 98 are depicted in the embodiment in FIG. 4. The housing 94 may include a detachable cover (not shown). The at least one insulator may include multiple portions to adhere to the contours of the housing 94. The at least one insulator may also be disposed between the gearing 92 and the detachable cover.

The insulators described herein, 58, 60, 96, 98 may be made from any material that is suitable to insulate the lubricating fluids that are used in differentials, transfer cases, or other gearboxes that are typically found on vehicles. Categories of materials that may be used to construct the insulators may include, but are not limited to, thermoplastics, thermosetting polymers or plastics, and ceramics. Specific materials that may be used to construct the insulators may include, but are not limited to, polyurethane, acrylonitrile butadiene styrene (ABS), and polystyrene.

The disclosure should not be construed as limited to the type of differential described in FIGS. 2 and 3 and the type of transfer case described in FIG. 4, but should be construed to include all the types of differentials and transfer cases described above and others that are known by a person of ordinary skill in the art.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle gearbox comprising:
    a differential carrier and a ring gear disposed in a housing and configured to transfer power via an input shaft to wheels via output shafts; and
    first and second plastic insulators having external surfaces, disposed in the housing, around the carrier, on opposite sides of the ring gear, respectively, the external surfaces maintaining continuous contact with an internal surface of the housing along top, back, and bottom sides of the housing.

2. The gearbox of claim 1, wherein the housing includes a detachable cover, the cover forming the back side of the housing including a portion of the internal surface that extends along the back side of the housing.

3. The gearbox of claim 2, wherein the first insulator has a first portion, a second portion, and a third portion, and wherein the first portion is disposed between the carrier and the top side of the housing, the second portion is disposed between the carrier and the detachable cover, and the third portion is disposed between the carrier and the bottom side of the housing.

4. The gearbox of claim 1, wherein the output shafts is comprised of a first output shaft and a second output shaft, wherein, the wheels is comprised of a first wheel and a second wheel and wherein the first output shaft is connected to the first wheel and the second output shaft is connected to the second wheel.

5. An axle for a vehicle comprising:
    a housing having an internal surface;
    differential gearing, disposed in the housing, including a bevel ring gear that meshes with a first bevel gear affixed to an input shaft and at least one bevel planet gear rotatably disposed about a carrier that is affixed to the bevel ring gear, wherein the at least one bevel planet gear meshes with a second bevel gear affixed to a first output shaft and a third bevel gear affixed to a second output shaft;
    a first plastic insulator having a first surface, the first insulator disposed between the differential gearing and the housing and around the carrier along top, back, and bottom sides of the housing on a first side of the ring gear, the first external surface maintaining continuous contact with the internal surface along the top, back, and bottom sides of the housing; and
    a second plastic insulator having a second external surface, disposed between the differential gearing and the housing on a second side of the ring gear, opposite the ring gear relative to the first side, the second external surface maintaining continuous contact with the internal surface along the top, back, and bottom sides of the housing.

6. The axle of claim 5, wherein the housing includes a detachable cover, the cover forming the back side of the housing including a portion of the internal surface that extends along the back side of the housing.

7. The axle of claim 6, wherein the first insulator has a first portion, a second portion, and a third portion, and wherein the first portion is disposed between the differential gearing and the top side of the housing, the second portion is disposed between the differential gearing and the detachable cover, and the third portion is disposed between the differential gearing and the bottom side of the housing.

8. The axle of claim 5, wherein the second insulator has a first portion, a second portion, and a third portion, and wherein the first portion is disposed between the differential gearing and the top side of the housing, the second portion is disposed between the differential gearing and the back side of the housing, and the third portion is disposed between the differential gearing and the bottom side of the housing.

9. The axle of claim 8, wherein the input shaft is connected to a power source, the first output shaft is connected to a first wheel, and the second output shaft is connected to a second wheel.

10. A vehicle comprising:
a power source;
at least one wheel;
a gearbox, having a housing that includes an internal surface, gearing disposed in the housing, a first plastic insulator having a first external surface and disposed between the gearing and the housing, and a second plastic insulator having a second external surface and disposed between the gearing and the housing, wherein the gearing is configured to couple the power source to the at least one wheel, and wherein the first external surface of the first insulator and second external surface of the second insulator each maintain continuous contact with the internal surface along top, back, and bottom sides of the housing.

11. The vehicle of claim 10, wherein the housing includes a detachable cover, the cover forming the back side of the housing including a portion of the internal surface that extends along the back side of the housing.

12. The vehicle of claim 11, wherein the first insulator has a first portion, a second portion and a third portion, and wherein the first portion is disposed between the gearing and the top side of the housing, the second portion is disposed between the gearing and the detachable cover, and the third portion is disposed between the gearing and the bottom side of the housing.

13. The vehicle of claim 10, wherein the gearbox is a differential connected to an axle.

14. The vehicle of claim 10, wherein the at least one wheel is comprised of a first set of wheels and a second set wheels, and wherein the gearbox is a transfer case that is configured to transfer power to a first axle connected to the first set of wheels and a second axle connected to the second set of wheels.

* * * * *